(12) United States Patent
Trytko et al.

(10) Patent No.: US 10,760,765 B2
(45) Date of Patent: Sep. 1, 2020

(54) MULTI-PURPOSE SAFETY ACCESSORIES

(71) Applicant: SMART LITE TECHNOLOGIES LTD., Langley (CA)

(72) Inventors: David Andrew Trytko, Langley (CA); Martin William Vanderhoek, Langley (CA)

(73) Assignee: SMART LITE TECHNOLOGIES LTD., Langley (CA)

( * ) Notice: Subject to any disclaimer, the term of this patent is extended or adjusted under 35 U.S.C. 154(b) by 0 days.

(21) Appl. No.: 16/657,500

(22) Filed: Oct. 18, 2019

(65) Prior Publication Data
US 2020/0124245 A1 Apr. 23, 2020

Related U.S. Application Data

(60) Provisional application No. 62/748,816, filed on Oct. 22, 2018.

(51) Int. Cl.
*F21S 43/20* (2018.01)
*F21S 43/37* (2018.01)
(Continued)

(52) U.S. Cl.
CPC ............. *F21S 43/26* (2018.01); *B60Q 1/32* (2013.01); *B60Q 1/52* (2013.01); *B60R 1/10* (2013.01); *F21S 43/14* (2018.01); *F21S 43/31* (2018.01); *F21S 43/37* (2018.01); *H05B 45/20* (2020.01); *H05B 45/40* (2020.01); *B60R 1/1207* (2013.01); *F21W 2103/25* (2018.01); *F21W 2103/30* (2018.01); *F21W 2103/45* (2018.01);
(Continued)

(58) Field of Classification Search
CPC .. F21S 43/14; F21S 43/26; F21S 43/31; F21S 43/37; H05B 45/20; H05B 45/40; B60Q 1/32; B60Q 1/52; B60R 1/06; B60R 1/10; B60R 1/1207; F21Y 2105/18; F21Y 2113/13; F21W 2105/00
See application file for complete search history.

(56) References Cited

U.S. PATENT DOCUMENTS 5,479,297 A 12/1995 Summers
2005/0146886 A1* 7/2005 Furuya ................. B60Q 1/2665
362/494
(Continued)

FOREIGN PATENT DOCUMENTS

WO 2005/014339 A1 2/2005

*Primary Examiner* — Alan B Cariaso
(74) *Attorney, Agent, or Firm* — Dentons Canada LLP

(57) ABSTRACT

A safety accessory for mounting on a vehicle comprises a housing having a front side and a back side, and a laterally extending mounting portion for connecting to the vehicle, a mirror mounted on the front side, and a bulb assembly within the housing facing the back side. The bulb assembly comprises a plurality of white, amber and red light sources, and a control circuit connected between light sources and a plurality of inputs. The control circuit causes the white light sources to be on when power is received at a first input, the amber light sources to flash in a standard flash pattern when power is received at a second input, the red light sources to flash in the standard pattern when power is received at a third input, and the amber light sources to flash in an emergency strobe pattern when power is received at a fourth input.

6 Claims, 5 Drawing Sheets

(51) Int. Cl.
  *B60Q 1/52* (2006.01)
  *F21S 43/31* (2018.01)
  *H05B 45/20* (2020.01)
  *B60R 1/10* (2006.01)
  *F21S 43/14* (2018.01)
  *B60Q 1/32* (2006.01)
  *H05B 45/40* (2020.01)
  *F21W 103/45* (2018.01)
  *F21Y 113/13* (2016.01)
  *F21W 103/30* (2018.01)
  *F21W 103/25* (2018.01)
  *F21Y 105/18* (2016.01)
  *F21Y 115/10* (2016.01)
  *F21W 105/00* (2018.01)
  *B60R 1/12* (2006.01)

(52) U.S. Cl.
  CPC ...... *F21W 2105/00* (2018.01); *F21Y 2105/18* (2016.08); *F21Y 2113/13* (2016.08); *F21Y 2115/10* (2016.08)

(56) References Cited

U.S. PATENT DOCUMENTS

| | | | | |
|---|---|---|---|---|
| 2012/0020101 A1* | 1/2012 | Pastrick | ............... | B60Q 1/2665 362/494 |
| 2012/0075879 A1* | 3/2012 | Uematsu | ................... | B60R 1/10 362/540 |
| 2012/0294027 A1* | 11/2012 | Merriman | ............ | B60Q 1/2665 362/519 |
| 2014/0268858 A1* | 9/2014 | Norris | ....................... | B60Q 1/44 362/545 |

* cited by examiner

MULTI-PURPOSE SAFETY ACCESSORIES

CROSS REFERENCE TO RELATED APPLICATION

This application claims the benefit of priority of U.S. Provisional Patent Application No. 62/748,816 filed Oct. 22, 2018, which is hereby incorporated by reference herein in its entirety.

TECHNICAL FIELD

The present disclosure relates to vehicle accessories, in particular to accessories for large commercial vehicles.

BACKGROUND

A significant portion of commercial truck collisions are directly related to the front end blind spots that professional drivers are plagued with on a daily basis. In North America alone over 5000 deaths and 140,000 injuries occur annually. Prior attempts to address this issue include those disclosed in U.S. Pat. No. 5,479,297 to Summers and International Patent Application Publication No. WO2005014339A1 to Vanderhoek.

The inventors have determined a need for improved accessories for increasing safety on commercial vehicles.

SUMMARY

One aspect of the present disclosure provides a safety accessory for mounting on a vehicle in a mounting position rearward of a side mirror. The safety accessory comprises a housing having a front side facing toward a front end of the vehicle and a back side facing toward a back end of the vehicle, and a laterally extending mounting portion for connecting to the vehicle, a mirror mounted on the front side of the housing, and a bulb assembly within the housing and facing toward the back side of the housing. The bulb assembly comprises a plurality of white light sources, a plurality of amber light sources, a plurality of red light sources, and a control circuit operatively connected between the pluralities of white, amber and red light sources and a plurality of inputs. The control circuit is configured to cause the plurality of white light sources to be on when power is received at a first input of the plurality of inputs, cause the plurality of amber light sources to flash in a standard flash pattern when power is received at a second input of the plurality of inputs, cause the plurality of red light sources to flash in the standard pattern when power is received at a third input of the plurality of inputs, and cause the plurality of amber light sources to flash in an emergency strobe pattern when power is received at a fourth input of the plurality of inputs.

Further aspects of the present disclosure and details of example embodiments are set forth below.

DRAWINGS

The following figures set forth embodiments in which like reference numerals denote like parts. Embodiments are illustrated by way of example and not by way of limitation in the accompanying figures.

Figure 2:
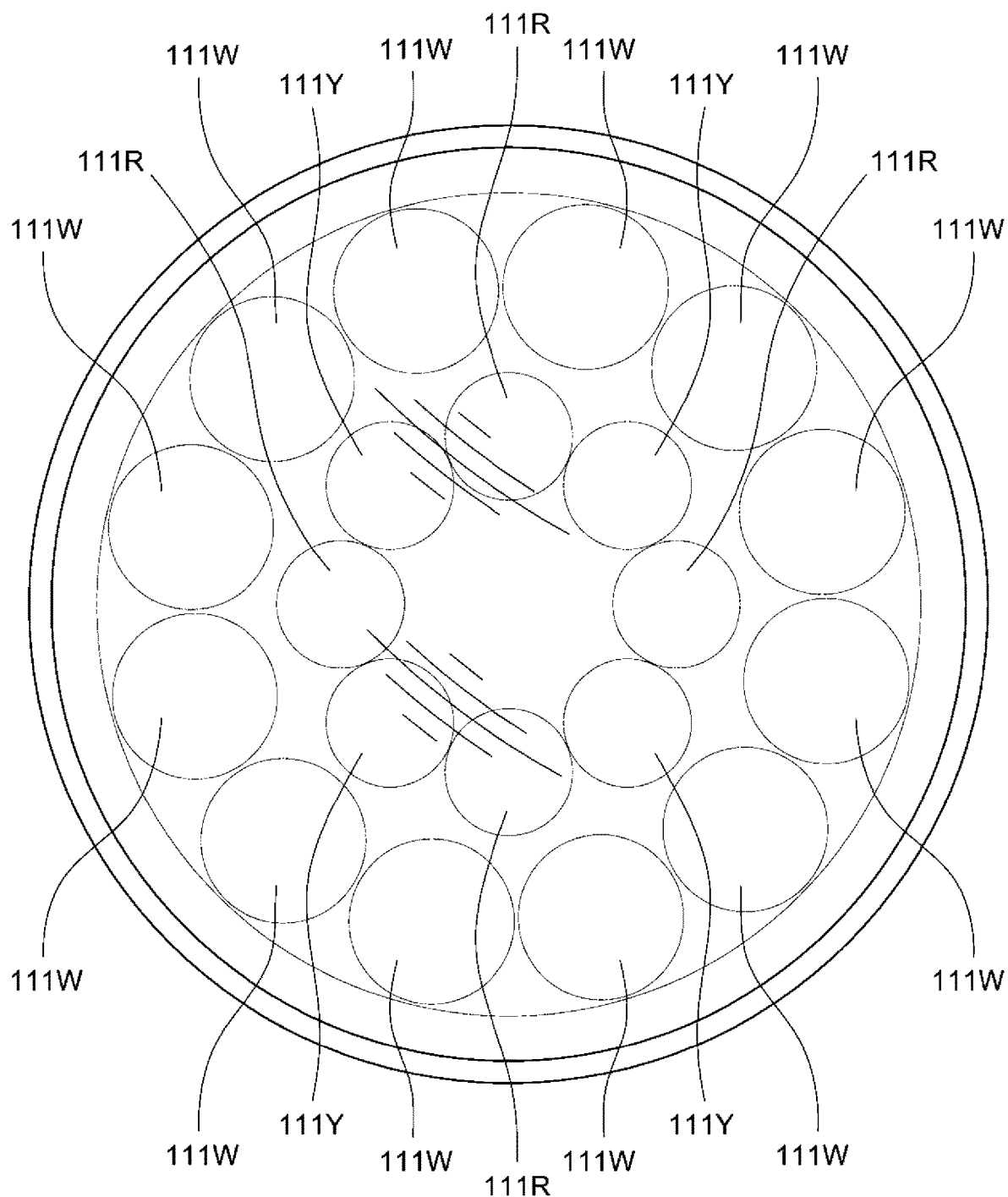
FIG. 2 shows an example bulb assembly of the accessory of FIG. 1.
Figure 5:
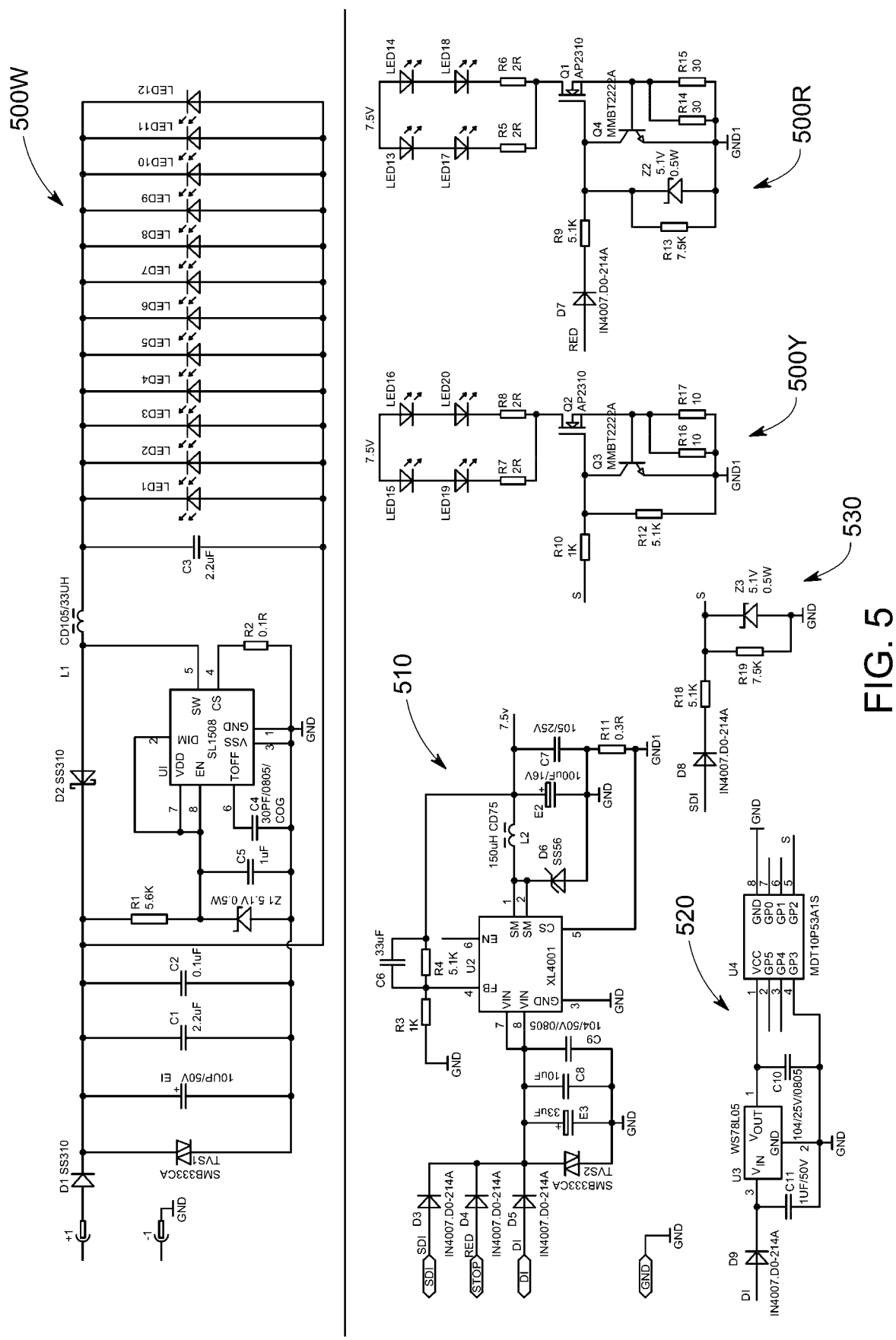

FIG. 5 schematically illustrates example circuits for the bulb assembly of FIG. 2.

DETAILED DESCRIPTION

The following describes a safety accessory that combines a blind spot mirror, a backup light, two different color turn signals and an emergency strobe into a single unit. In some embodiments, such multiple safety functions may be provided by a forward facing mirror and a rearward facing bulb assembly contained within an aerodynamic housing, as described below.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Figure 1:
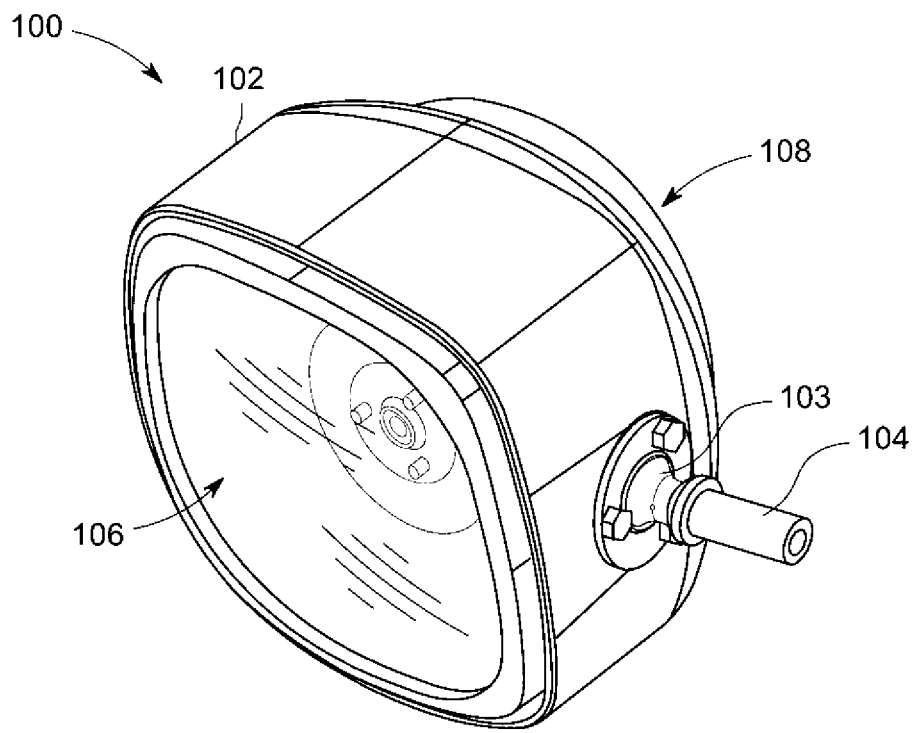
FIG. 1 shows an example multi-purpose safety accessory according to one embodiment of the present disclosure.
Figure 1A:
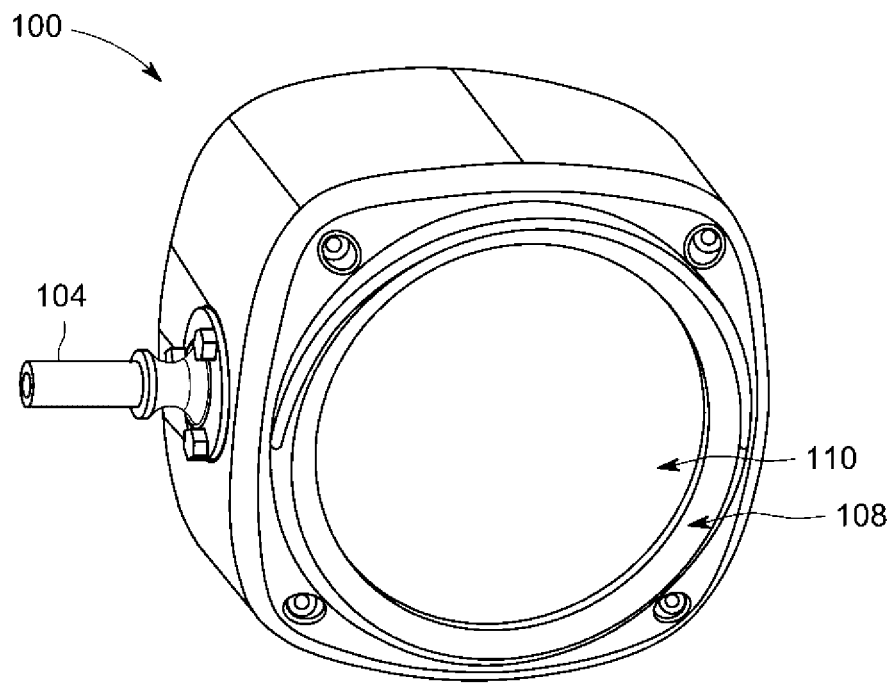
FIG. 1A shows a rear perspective view of the accessory of FIG. 1.

FIGS. 1 and 1A show an example safety accessory 100 according to one embodiment of the present invention. Accessory 100 comprises a housing 102 which has a mounting portion 103 on a side portion thereof form mounting on a vehicle (not shown). A cable 104 extends through the mounting portion 103 for connection to the vehicle's electrical system. The housing 102 has a mirror 106 on one face thereof, and a lens 108 on an opposed face thereof. A bulb assembly 110 is installed within the housing 102, and is connected to the vehicle's electrical system by a plurality of conductors within the cable 104.

FIG. 2 is a front view of an example blub assembly 110, which comprises a plurality of white light sources 111W, amber light sources 111Y and red light sources 111R. The light sources may, for example comprise light emitting diodes (LEDs). In the illustrated example, the bulb assembly 110 has twelve white light sources 111W arranged in a circle around an outer portion of the bulb assembly 110, and four each of amber light sources 111Y and red light sources 111R arranged in a circle of eight in the inner portion of the bulb assembly 110.

Figure 3:
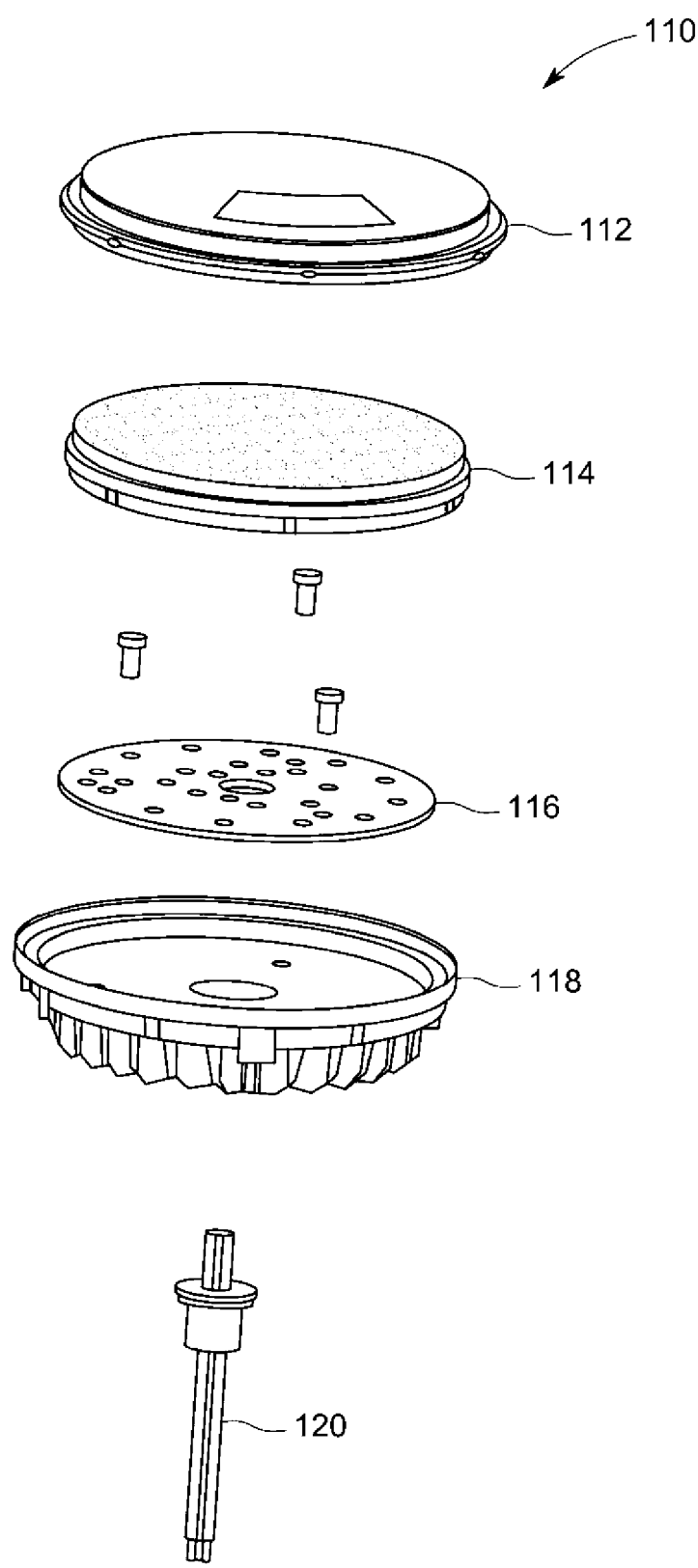
FIG. 3 is an exploded view of the bulb assembly of FIG. 2.

FIG. 3 is an exploded view of the bulb assembly 110. In the illustrated example, the bulb assembly 110 comprises a top cover 112, a reflector array 114, a printed circuit board (PCB) 116, and a base 118. The light sources 111W/111Y/111R are mounted on the PCB 116, and positioned to be received in apertures in the reflector array 114 such that their light is directed through the top cover 112. The PCB 116 is mounted on the base, and operatively coupled to the vehicle's electrical system by a plurality of conductors 120. The conductors 120 function as inputs to a control circuit on the PCB 116 as described below.

Figure 4:
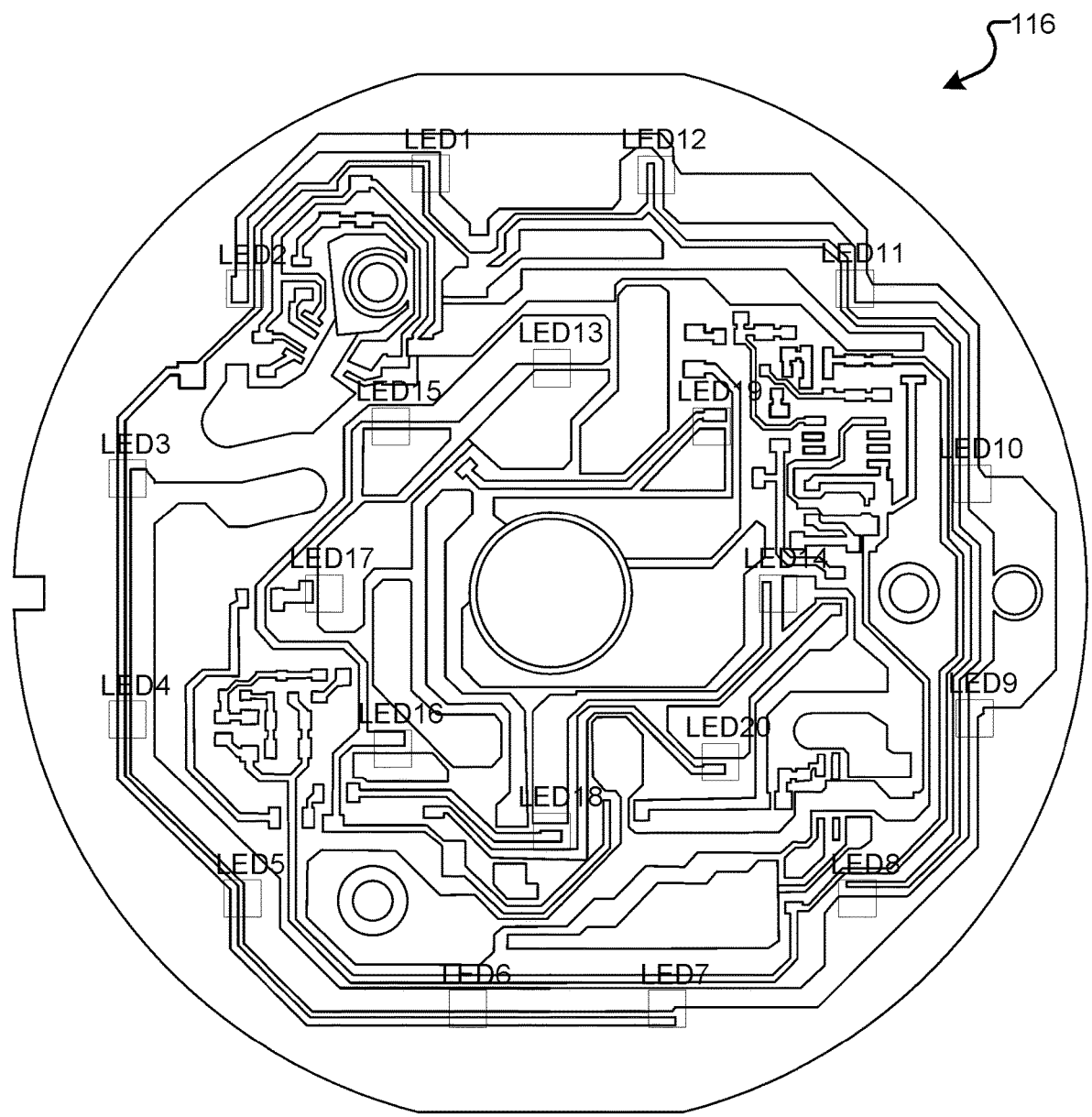
FIG. 4 shows an example layout of a printed circuit board for the bulb assembly of FIG. 2.

FIG. 4 shows an example circuit layout for the PCB 116, with approximate positions of the LEDs (indicated as LED1-LED20) overlaid thereon. FIG. 5 schematically illustrates an example control circuit for controlling the light sources 111W/111Y/111R.

As shown in FIG. 5, the control circuit comprises a first sub-circuit 500W that controls the white light sources 111W (LED1-LED12), a second sub-circuit 500Y that controls the amber light sources 111Y (LED15, LED16, LED19 and LED 20), and a third sub-circuit 500R that controls the red light sources 111R (LED 13, LED14, LED17, LED18). The first sub-circuit 500W is configured to cause the white light sources 111W to turn on when power is received a first input (labelled as +1 in FIG. 5) of the conductors 120. The second and third sub-circuits 500Y and 500R are connected to receive 7.5V electrical power from a power sub-circuit 510 when power is received at any of a second input (labelled as SDI in FIG. 5), a third input (labelled as RED in FIG. 5) or a fourth input (labelled as DI in FIG. 5) of the conductors 120. The second sub-circuit 500Y also receives a secondary input (labelled as S in FIG. 5) from one of a standard flash sub-circuit 530 (which receives the second input SDI) or an emergency flash sub-circuit 520 (which receives the fourth input DI), and is configured to cause the amber light sources 111Y to flash in a standard pattern (e.g., a regular on/off pattern such as used for turn signals) when the second input SDI is powered, and flash in an emergency strobe pattern (e.g., a repeating pattern comprising two rapid flashes followed by a pause of about 0.25 to 0.5 seconds, then two more rapid flashes) when the fourth input DI is powered. The third sub-circuit 500R is configured to cause the red light sources 111R to flash in the standard pattern.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Although the embodiments have been described in detail, it should be understood that various changes, substitutions and alterations can be made herein. Moreover, the scope of the present application is not intended to be limited to the particular embodiments of the process, machine, manufacture, composition of matter, means, methods and steps described in the specification. As can be understood, the examples described above and illustrated are intended to be exemplary only.

As will be apparent to those skilled in the art in light of the foregoing disclosure, many alterations and modifications are possible to the methods and systems described herein. While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as may reasonably be inferred by one skilled in the art. The scope of the claims should not be limited by the embodiments set forth in the examples, but should be given the broadest interpretation consistent with the foregoing disclosure.

The present disclosure may be embodied in other specific forms without departing from its spirit or essential characteristics. The described embodiments are to be considered in all respects only as illustrative and not restrictive.

The invention claimed is:

1. A safety accessory for mounting on a vehicle in a mounting position rearward of a side mirror, the safety accessory comprising:
    a housing having a front side facing toward a front end of the vehicle and a back side facing toward a back end of the vehicle, and a laterally extending mounting portion for connecting to the vehicle;
    a mirror mounted on the front side of the housing; and,
    a bulb assembly within the housing and facing toward the back side of the housing, the bulb assembly comprising a plurality of white light sources, a plurality of amber light sources, a plurality of red light sources, and a control circuit operatively connected between the pluralities of white, amber and red light sources and a plurality of inputs, wherein the control circuit is configured to:
        cause the plurality of white light sources to be on when power is received at a first input of the plurality of inputs;
        cause the plurality of amber light sources to flash in a standard flash pattern when power is received at a second input of the plurality of inputs;
        cause the plurality of red light sources to flash in the standard pattern when power is received at a third input of the plurality of inputs; and,
        cause the plurality of amber light sources to flash in an emergency strobe pattern when power is received at a fourth input of the plurality of inputs.

2. The safety accessory of claim 1 wherein the bulb assembly comprises a cover, a reflector array a printed circuit board, and a base, wherein the printed circuit board is mounted on the base, the control circuit and the white, amber and red light sources are mounted on the printed circuit board, and the reflector array is held between the cover and the printed circuit board and comprises an aperture for receiving each of the white, amber and red light sources.

3. The safety accessory of claim 2 wherein the white light sources are arranged in a first circle around an outer portion of the bulb assembly, and the amber and red light sources are arranged in alternating fashion in a second circle inside of and concentric with the first circle.

4. A bulb assembly for a vehicle, the bulb assembly comprising:
    a plurality of white light sources;
    a plurality of amber light sources;
    a plurality of red light sources; and
    a control circuit operatively connected between the pluralities of white, amber and red light sources and a plurality of inputs, wherein the control circuit is configured to:
        cause the plurality of white light sources to be on when power is received at a first input of the plurality of inputs;
        cause the plurality of amber light sources to flash in a standard flash pattern when power is received at a second input of the plurality of inputs;
        cause the plurality of red light sources to flash in the standard pattern when power is received at a third input of the plurality of inputs; and, cause the plurality of amber light sources to flash in an emergency strobe pattern when power is received at a fourth input of the plurality of inputs.

5. The bulb assembly of claim 4 wherein the bulb assembly comprises a cover, a reflector array a printed circuit board, and a base, wherein the printed circuit board is mounted on the base, the control circuit and the white, amber and red light sources are mounted on the printed circuit board, and the reflector array is held between the cover and the printed circuit board and comprises an aperture for receiving each of the white, amber and red light sources.

6. The bulb assembly of claim 5 wherein the white light sources are arranged in a first circle around an outer portion of the bulb assembly, and the amber and red light sources are arranged in alternating fashion in a second circle inside of and concentric with the first circle.

\* \* \* \* \*